United States Patent
Hwang et al.

(10) Patent No.: US 9,893,542 B2
(45) Date of Patent: Feb. 13, 2018

(54) SYSTEMS AND METHODS FOR BATTERY CHARGING

(71) Applicant: X Development LLC, Mountain View, CA (US)

(72) Inventors: Tai Sup Hwang, Santa Clara, CA (US); Ramesh C Bhardwaj, Fremont, CA (US); Sheba Devan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 14/731,142

(22) Filed: Jun. 4, 2015

(65) Prior Publication Data

US 2016/0359339 A1    Dec. 8, 2016

(51) Int. Cl.
H02J 7/00 (2006.01)
H02J 7/04 (2006.01)

(52) U.S. Cl.
CPC .......... H02J 7/0047 (2013.01); H02J 7/0077 (2013.01); *H02J 2007/0049* (2013.01)

(58) Field of Classification Search
CPC ........ H02J 7/0003; H02J 7/0004; H02J 7/007; H02J 7/008; H02J 7/0047; H02J 2007/0049; H02J 7/0077; H02J 7/0088; H02J 7/009; H02J 7/0091; H02J 7/0093
USPC ......................................................... 320/116
See application file for complete search history.

(56) References Cited

U.S. PATENT DOCUMENTS 5,714,866 A    2/1998  S et al.
7,777,452 B2 *  8/2010  Nishiyama ........ H01M 10/0525
                                                    320/129
7,825,636 B2 *  11/2010 Partin ................... H02J 7/0073
                                                    320/116
8,125,185 B2    2/2012  Takeno
8,760,113 B2    6/2014  Keating et al.
2004/0195996 A1 * 10/2004 Nishida ................. H02J 7/0073
                                                    320/103

(Continued)

FOREIGN PATENT DOCUMENTS

KR    1020150039844    4/2015
WO    2010/135260      11/2010

OTHER PUBLICATIONS

International Search Report, International Application No. PCT/US2016/035018, dated Sep. 9, 2016.

(Continued)

*Primary Examiner* — Drew A Dunn
*Assistant Examiner* — Michael DiBenedetto
(74) *Attorney, Agent, or Firm* — McDonnell Boehnen Hulbert & Berghoff LLP

(57) ABSTRACT

This disclosure relates to systems and methods for charging a battery. An example embodiment includes receiving information about an initial state of charge of a battery. If an initial state of charge is less than a predetermined threshold and if a charger is electrically coupled to the battery, a charger may be configured to charge the battery according to a preferred charge rate higher than a default charge rate. A charging duration is determined based on a type of the battery, the initial state of charge, a target state of charge, and the charge rate. A controller may determine a partial charge condition based on at least one of: providing electrical current to the battery at the charge rate for the charging duration or receiving information indicative of a state of charge of the battery reaching the target state of charge.

20 Claims, 7 Drawing Sheets

(56) References Cited

U.S. PATENT DOCUMENTS

| | | | |
|---|---|---|---|
| 2008/0224653 A1* | 9/2008 | Yeh | H02J 7/0031 |
| | | | 320/103 |
| 2009/0243549 A1 | 10/2009 | Matsumura et al. | |
| 2010/0237831 A1 | 9/2010 | Osswald et al. | |
| 2011/0018679 A1 | 1/2011 | Davis et al. | |
| 2011/0234173 A1* | 9/2011 | Kao | H02J 7/0073 |
| | | | 320/150 |

* cited by examiner

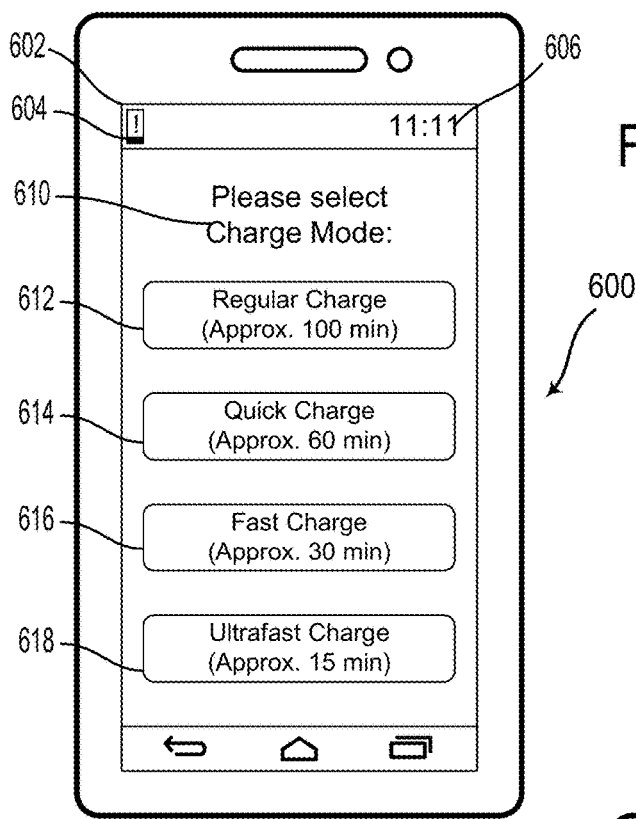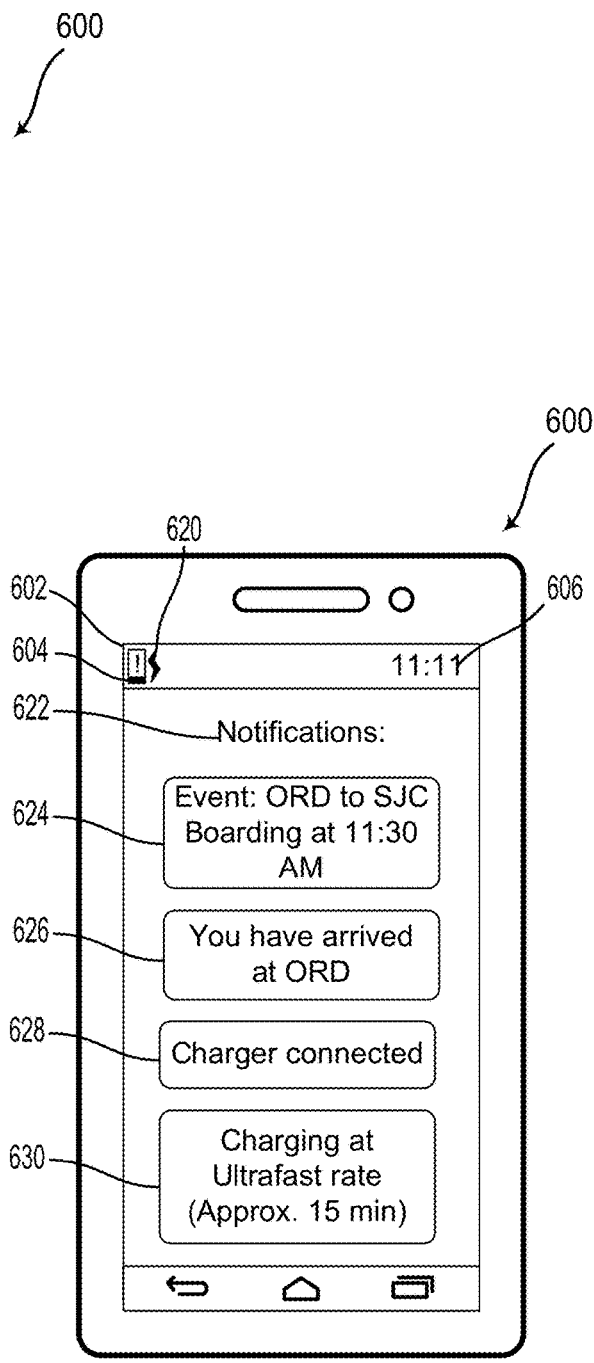
Figure 6A
Figure 6B

SYSTEMS AND METHODS FOR BATTERY CHARGING

BACKGROUND

A battery may store and supply energy through electrochemical reactions. While some batteries may only be used once, rechargeable batteries, also called secondary cells, may be charged and discharged many times over the lifetime of the battery.

Various types of electric systems and electronic devices are powered by such rechargeable batteries. For example, electric vehicles, power tools, smart phones, tablet devices, digital music players, keyboards, human interface devices, and laptop computers, among many other types of devices are powered by rechargeable batteries. With a growing abundance of such systems and devices, the demand for efficiently charging the batteries used to power these systems and devices continues to grow.

SUMMARY

A system may include a battery, a charger, and a controller. The controller may be configured to control the charger to provide an electrical current, to the battery at a determined charge rate for a determined amount of time. The charge rate may be higher than a default charge rate. The controller may be configured to stop the charger from charging the battery once a partial charge condition has been achieved, e.g. by determining the battery has reached a predetermined state of charge, so as to prevent long term cycle damage to the battery.

In a first aspect, a system is provided. The system includes a battery, a charger, and a controller. The battery is of a given battery type. The battery type includes a full charge capacity and a default charge rate. The battery initially has an initial state of charge. The charger is configured to controllably provide an electrical current to the battery. The controller is configured to receive information indicative of the initial state of charge of the battery. The controller is further configured to determine whether the initial state of charge is less than a predetermined threshold. The controller is also configured to determine whether the charger is electrically coupled to the battery. The controller is yet further configured to receive an input indicative of a preferred charge option. The preferred charge option includes a charge rate higher than the default charge rate. The controller is additionally configured to determine a charging duration based on the battery type, the initial state of charge, a target state of charge, and the charge rate. The target state of charge is based on the charge rate. The target state of charge is less than the full charge capacity. The controller is configured to, subsequent to determining the initial state of charge is less than a predetermined threshold and determining the charger is electrically coupled to the battery, cause the charger to provide electrical current to the battery at the charge rate. The controller is configured to determine a partial charge condition based on at least one of: providing electrical current to the battery at the charge rate for the charging duration or receiving information indicative of a state of charge of the battery reaching the target state of charge. The controller is yet further configured to in response to determining the partial charge condition, cause the charger to stop providing electrical current to the battery.

In a second aspect, a method is provided. The method includes receiving information indicative of an initial state of charge of a battery. The battery is configured to be charged at a default charge rate. The method further includes determining whether the initial state of charge is less than a predetermined threshold. The method also includes determining whether a charger is electrically coupled to the battery and receiving an input indicative of a preferred charge option. The preferred charge option includes a charge rate higher than the default charge rate. The method also includes determining a charging duration based on a type of the battery, the initial state of charge, a target state of charge, and the charge rate. The target state of charge is based on the charge rate, and the target state of charge is less than a full charge capacity of the battery. The method includes, subsequent to determining the initial state of charge is less than a predetermined threshold and determining the charger is electrically coupled to the battery, causing the charger to provide electrical current to the battery at the charge rate. The method additionally includes determining a partial charge condition based on at least one of: providing electrical current to the battery at the charge rate for the charging duration or receiving information indicative of a state of charge of the battery reaching the target state of charge. The method also includes, responsive to determining the partial charge condition, causing the charger to stop providing electrical current to the battery.

In a third aspect, a method is provided. The method includes receiving information indicative of an initial state of charge of a battery. The battery is configured to be charged at a default charge rate. The method also includes determining whether the initial state of charge is less than a predetermined threshold and determining whether a charger is electrically coupled to the battery. The method yet further includes receiving an input indicative of a preferred charge option. The preferred charge option includes a charge rate higher than the default charge rate. The method additionally includes determining a charging duration based on a type of the battery, the initial state of charge, a target state of charge, and the charge rate. The target state of charge is based on the charge rate, and the target state of charge is less than a full charge capacity of the battery. The method also includes, subsequent to determining the initial state of charge is less than a predetermined threshold and determining the charger is electrically coupled to the battery, causing the charger to provide electrical current to the battery at the charge rate. The method further includes determining a partial charge condition based on at least one of: providing electrical current to the battery at the charge rate for the charging duration or receiving information indicative of a state of charge of the battery reaching the target state of charge. The method yet further includes responsive to determining the partial charge condition, causing the charger to stop providing electrical current to the battery.

Other aspects, embodiments, and implementations will become apparent to those of ordinary skill in the art by reading the following detailed description, with reference where appropriate to the accompanying drawings.

BRIEF DESCRIPTION OF THE FIGURES

FIGS. 6A and 6B illustrate a mobile device according to example embodiments.

DETAILED DESCRIPTION

I. Overview

Figure 1A:
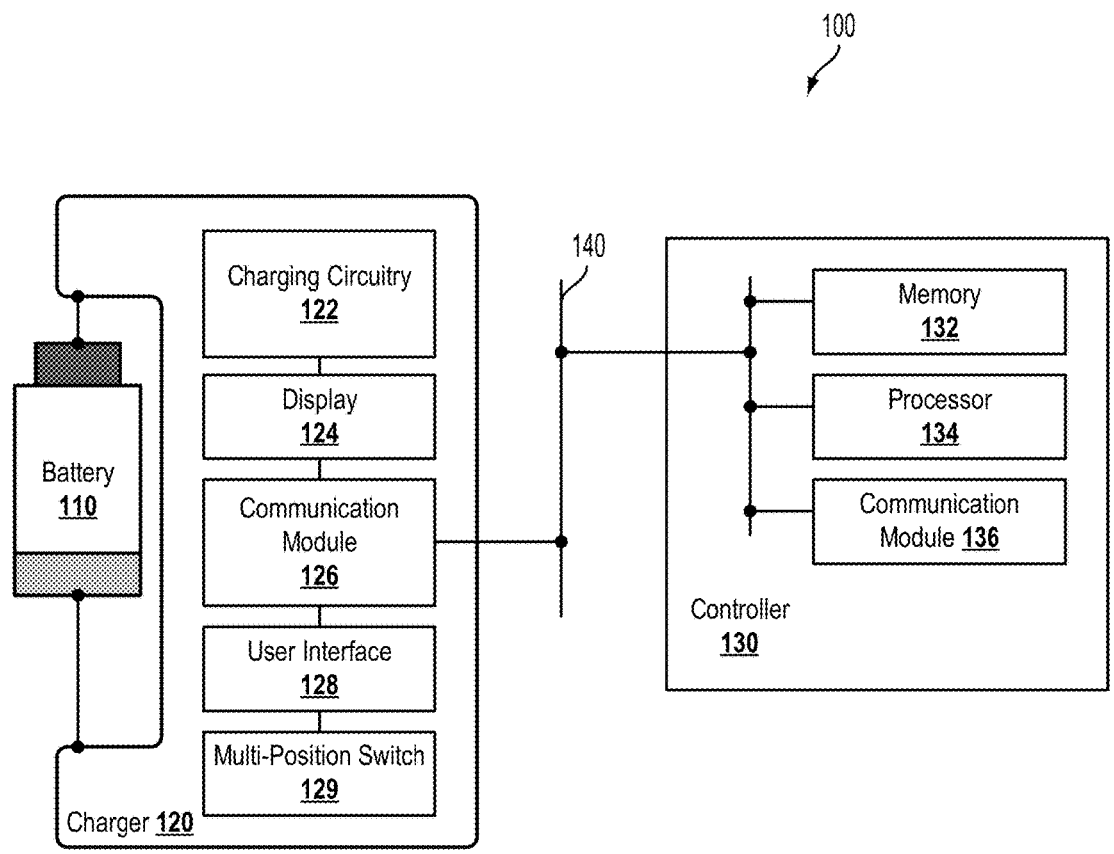
FIG. 1A is a block diagram of a system, according to an example embodiment.

Batteries may include one or more electrochemical cells. Furthermore, the electrochemical cell(s) may include, among other elements, an electrode, an anode, and an electrolyte. Each element of the electrochemical cell may include various materials. An electrical capacity of a battery is the amount of charge able to be stored in the battery and may be based on the size and number of cells and their material composition. Furthermore, a battery type may represent a battery with a known capacity, size and number of cells (e.g. a battery pack), and electrochemical composition, e.g. lithium ion.

For typical consumer electronic devices, the battery charging process may take 100 minutes or more to achieve a 100% charge. In an effort to improve battery charging speed, a common tradeoff is to use longer, thinner electrodes, which may also result in a reduction in energy density. The reduced energy density may occur due to incorporating a larger proportion of non-active material in the battery volume.

Over the course of charging and discharging the battery, and/or during the battery's cycle life, the electrical capacity of a secondary battery may decrease. That is, the amount of charge that can be stored and provided by the battery may become less over repeated charging cycles. The degradation of the electrical capacity of the battery may depend on several factors including the battery type and the number of charging cycles undergone. Perhaps most significantly, charging the battery at relatively high charging rate may cause more rapid degradation in battery capacity.

In such a scenario, if a battery is forced to charge at a high rate without a redesign of the electrode arrangement, the capacity degradation per cycle may become significant. For example, if a 1.2× faster charge may sacrifice the cycle life by 20-30%, a 1.5× faster charge may cause 30-50% faster capacity degradation over 500 charge/discharge cycles. Other degradation rates are possible.

The systems and methods disclosed herein may be used with consumer electronic devices such as smartphones, tablets, laptops, wearable computing devices, auxiliary batteries, and other devices with rechargeable batteries. Additionally or alternatively, the system and method may be used with large format batteries, such as batteries suitable for residential or commercial use, electric vehicles, or unmanned aerial vehicles.

For example, a battery may be used to power an electric vehicle travelling from San Francisco to Los Angeles. Consider that halfway between San Francisco and Los Angeles, the battery of the electric vehicle may need to be recharged in order to continue on to Los Angeles. As a general matter, it may take approximately eight or more hours to recharge the battery back to a full charge, e.g., to a 100% state of charge (SOC). However, from a practical standpoint, charging the battery for eight or more hours may be undesirable and/or burdensome to the driver. In particular, the driver may wish to avoid waiting eight hours in a location between San Francisco and Los Angeles, just to recharge the battery of the electric vehicle. Further, the driver may wish to avoid a total time of approximately sixteen hours for travelling from San Francisco to Los Angeles, e.g., eight hours for charging the battery plus eight hours of driving.

In some embodiments, increasing the rate of charging the battery may charge the battery faster. For example, considering the scenario above, by charging the battery with a standard rate, such as a 1 C rate, it may take approximately the eight or more hours to recharge the battery of the electric vehicle to the 100% SOC. However, by charging the battery with a higher rate, such as a 1.5 C rate, it may take significantly less time to charge the battery. For example, by charging the battery with the 1.5 C rate, it may take only one to two hours to charge the battery to a 100% SOC.

Yet, as a general matter, increasing the rate of charging the battery may decrease the cycle life of the battery, e.g., the number of charge cycles during the life of the battery. From a practical standpoint, decreasing the cycle life of the battery may also be undesirable and/or burdensome to a driver that owns the electric vehicle. In particular, considering the scenario above, charging the battery at the 1.5 C rate may reduce the cycle life of the battery to approximately 400 to 600 cycles.

It should be noted that the example embodiments for intelligently charging a battery may be pertinent to various other applications. For example, consider another scenario such that a user is charging the battery of a smartphone at an airport. In such instances, the user may need to board an airplane in thirty minutes and there may not be enough time to charge to the 100% SOC. In some instances, the user may wish charge the battery of the smartphone at the 1.5 C rate to charge the battery faster. Yet, as noted above, simply increasing the rate to charge the battery may lead to battery degradation, thereby decreasing the cycle life of the battery.

In an example embodiment, a user-selectable charge process may provide a charging rate faster than a default charging rate without compromising cycle performance or energy density. Specifically, the user-selectable charge process may be helpful in situations where a battery is fully or almost fully depleted and when charging time is limited. For instance, a system and method may provide a user with a plurality of charging speed options based on a specific situation without sacrificing either original battery capacity or cycle performance.

In another example embodiment, a charge mode may be selected automatically based on a contextual scenario. For example, a cloud server system or another device may determine, based on the contextual scenario, that a user of a device may have a limited time, e.g. 30 minutes, before their flight boards. Such a determination may be based on a known flight itinerary, boarding time, GPS position, gate location, current time, etc. In such a scenario, the cloud server system and/or another device may determine that a fast charging rate is appropriate to use given the contextual scenario and select a "fast" charge rate as the preferred charge option for methods described herein. For instance, a fast charge rate may be configured to charge the battery up to 70% state of charge in 30 minutes.

In yet another scenario, a charge mode may be selected automatically based on a driving situation. For instance, if a user is driving to work via a usual route, a cloud server system or another device may determine that based on current traffic conditions, the user's commute will take about 60 minutes. In such a situation, the cloud server system and/or other device may automatically select a "quick"

charge rate, which may be configured to charge the battery up to 90% state of charge in 60 minutes.

In a further scenario, a "normal" charge rate may be automatically selected for situations in which a cloud server system and/or another computing device may predict that few or no time constraints on charging exist. For example, if a GPS location, time, and/or other user information indicates that a user is at home near bedtime, the computing device may automatically select a "normal" charge rate in anticipation of having sufficient time to charge the battery up to 100% SOC in approximately 100 minutes. Other context-sensitive situations are contemplated herein.

In an example charge process, the charging of a battery may be stopped at a predetermined state of charge. As an example, charging at a 2 C rate may not significantly affect cycle performance as long as a 45% state of charge level is not exceeded. Under such a scenario, a consumer electronic device might be charged at a 2 C rate up to 45% SOC in only about 15 minutes. Other charging rates, predetermined charge times, and predetermined states of charge are possible.

In an example embodiment, four different charging rates/times may be provided to a user. In some embodiments, the different rates/times may be provided based on a situational context. For example, the situation context may provide a time limitation (e.g. 15 minutes before leaving for a meeting or boarding an airplane). Additionally or alternatively, the situational context may provide a charge rate limitation (e.g. available charging hardware can only support charge rates of 2 C or less). The user may choose one of the charging rates/times and a charger may charge the battery according to the selected charging rate/time. Upon reaching the predetermined state of charge and/or the predetermined time, the charging process may stop.

In some embodiments, after conducting a "fast charge" process as described above, the charger may stop for a predetermined wait time. After waiting for the predetermined wait time, the charger may restart charging at a lower charging rate, such as 0.7 C. The predetermined wait time may be based on the prior "fast" charging rate and the battery type, among other factors. The wait time period may provide time for: 1. intercalation of ions into the electrode bulk, 2. mass transfer of ions within the battery material, and/or 3. diffusion of ions in the electrolyte bulk. In some scenarios, the wait time period may serve to reduce the irreversible effects of fast charging.

II. Example Systems

FIG. 1A is a block diagram of a system 100, according to an example embodiment. System 100 may include a battery 110, a charger 120, and a controller 130. The battery 110 may include a secondary battery configured to be recharged via a charging current from charger 120. The battery 110 may include various materials including, but not limited to, lead-acid, nickel-cadmium, nickel metal hydride, lithium iron phosphate, lithium iron phosphate oxynitride (LIPON), lithium cobalt oxide, lithium-ion, lithium-ion polymer, or other materials. The battery 110 may include one or more electrochemical cells and may be optionally configured as a thin-film battery.

The battery 110 may be characterized as being of a particular battery type. In an example embodiment, the battery type may include a nominal cell voltage, an energy density, a battery material, a battery shape, a model number, a serial number, and/or other indicia that can help to differentiate between batteries. The battery 110 and/or the given battery type may have a characteristic full charge capacity, which may be an amount of charge that the battery 110 is operable to deliver at the nominal cell voltage. At a given point in time, the battery 110 may have an initial state of charge, which may be indicative of a current charge level. The initial state of charge may be expressed as a quantity of charge or as a percentage of the full charge capacity. Further, a default charge rate may be defined for charging battery 110 and/or for the given battery type. The default charge rate is a predetermined charge rate at which the battery 110 may be charged under normal conditions.

The charger 120 may include charging circuitry 122, a display 124, a communication module 126, and a user interface 128. The charging circuitry 122 may be controlled, at least in part, by controller 130 so as to provide the electrical charging current to the battery 110. Display 124 may include a light, e.g. one or more light emitting diodes, a liquid crystal display, and/or a display of a smartphone or another computing device. The display 124 may be configured to provide, among other information, data indicative of one or more charging options, a current state of charge of the battery 110, and/or a current charging state or rate.

The charger 120 may be configured to provide a controllable constant DC current to the battery 110. Additionally or alternatively, the charger 120 may be configured to provide a pulsed DC current to the battery 110. Other ways to controllably provide electrical power using charger 120 are contemplated herein.

In an example embodiment, the charging circuitry 122 may include a constant current constant voltage (CC/CV) charger. The charging circuitry 122 may include an integrated circuit designed for battery charging, such as the National Semiconductor LM3658 or the Maxim MAX 1551. However, other embodiments may additionally or alternatively include different circuits.

Various methods, processes, and/or functions may be used to charge the battery 110. More specifically, an electric current (also referred to herein as a "pulsed current", a "constant current", and/or a "current") may be supplied to the battery 110 for purposes of charging the battery 110. In some embodiments, an effective method for charging a given battery may be a less effective method for charging a different battery, e.g. if the two batteries have different capacities. For example, an electric current may be sufficient for charging a standard density battery (e.g., lithium or lithium-ion battery). However, this electric current may be insufficient for charging a battery with a high energy density. In such instances, charging the high energy density battery using this current may take substantially longer than it the time takes to charge the standard density battery. In such cases, the charging circuitry 122 and/or the controller 130 may be configured to detect the battery type, e.g. standard density or high energy density, of the battery 110. Furthermore, the charging circuitry 122 and/or the controller 130 may be configured to provide a set of charging options further based on the battery type of the battery 110.

The communication module 126 may be configured to provide a wireless communication link 140 with the controller 130, namely with a controller communication module 136. Communication link 140 may utilize one or more wired and/or wireless communication protocols. For example, the communication protocols may include Bluetooth, near-field communication (NFC), and/or another protocol.

The user interface 128 may include hardware and/or software operable to allow a user to select, modify, and/or control various aspects of the charger 120. In an example embodiment, the user interface 128 may include a switch. In another embodiment, the user interface 128 may include software and/or firmware, and possibly a device on which such software and/or firmware is executed. In such a scenario, the display 124 may include a touchscreen, and the user interface 128 may include a graphical user interface displayed on the display 124. The graphical user interface may provide graphical buttons, switches, sliders, or other interactive objects so as to allow a user of the system 100 to select and/or control the charger 120. In an example embodiment, a user may interact with a graphical user interface to select a preferred charge option from a set of charge options presented via the display 124. It is understood that many other ways to select a preferred charge option exist, which are all considered herein.

The controller 130 may include a memory 132 and a processor 134. As discussed above, the controller 130 may also include a communication module 136. The memory 132 may be configured to store information in various non-transitory formats. In an example embodiment, the memory 132 may store and/or include instructions that may be configured for execution by the processor 134 of controller 130. The processor 134 may include an integrated circuit, a central processing unit (CPU), an application-specific integrated circuit (ASIC), or another type of microprocessor associated with a computer.

The controller 130 may be configured to receive information indicative of the initial state of charge of the battery 110. The information may include data about the current being provided by the battery 110, temperature of the battery 110, a voltage of the battery 110, and/or a pressure of the battery 110. Other types of information indicative of a state of charge of a battery are contemplated herein.

The controller 130 is configured to determine, e.g. based on the received information, whether the initial state of charge of battery 110 is less than a predetermined threshold. In some embodiments, the predetermined threshold may be 10% of the full charge capacity of battery 110. However, other values of the predetermined threshold are possible.

The controller 130 is also configured to determine whether the charger 120 is electrically coupled to the battery 110. For example, the received information may include an indication that a voltage across two charging terminals of charger 120 is non-zero. In another embodiment, the received information may be indicative of a wired connection between the battery 110 and the charger. Other ways are possible to determine that the charger 120 is electrically connected to the battery 110. Furthermore, it should be understood that the charger 120 may be electrically coupled to the battery 110 via wired and/or wireless means. That is, the charger 120 may use an electromagnetic field to transfer energy to the battery 110, e.g. via inductive coupling. In an example embodiment, charger 120 may include an induction charger. In such a scenario, the charger 120 may include an induction coil operable to create an alternating electromagnetic field. Furthermore, battery 110 may be operable to receive power from the electromagnetic field and convert it into electrical current that may charge the battery 110.

The controller 130 is additionally configured to receive an input indicative of a preferred charge option. As described above, the preferred charge option may be received via the user interface 128 and the display 124. The controller 130 may receive information indicative of the preferred charge option via the communication link 140. The preferred charge option may be selected from a plurality of charge options. Each of the plurality of charge options may include charge rates that are higher than the default charge rate, e.g. involving charging at higher that standard C-rates.

The controller 130 is yet further configured to determine a charging duration based on the battery type, the initial state of charge, a target state of charge, and the charge rate. In an example embodiment, the target state of charge may be based on the charge rate of the preferred charge option. The target state of charge is less than the full charge capacity. For example, if the charge rate is a 2 C rate, e.g. "ultrafast", the target state of charge may be 45%. Other target states of charge are possible. That is, the controller 130 may include a predetermined target state of charge, which may delineate a "stopping point" for charging that is less than the full charge capacity. In some embodiments, the target state of charge may be based on minimizing degradation to battery cycle life.

The controller 130 may be configured to, subsequent to determining the initial state of charge is less than a predetermined threshold and determining the charger is electrically coupled to the battery, cause the charger to provide electrical current to the battery at the charge rate. That is, the controller 130 may initially confirm that the battery 110 needs a faster charge than normal and that the battery 110 is electrically-connected to the charger 120. The controller 130 may be configured to carry out other checks related to safety and/or electrical connectivity prior to charging the battery 110. As described elsewhere herein, the controller 130 may control the charger 120 to charge the battery 110 via various charging conditions. For example, the charger 120 may apply a constant current, constant voltage (CC-CV) charging condition. The controller 130 may be configured to charge battery 110 according to other types of charging conditions, processes, and/or procedures.

The controller 130 is configured to determine a partial charge condition based on at least one of: providing electrical current to the battery at the charge rate for the charging duration or receiving information indicative of a state of charge of the battery reaching the target state of charge. Also, in response to determining the partial charge condition, the controller 130 may be configured to cause the charger 120 to stop providing electrical current to the battery 110.

In an example embodiment, controller 130 may determine an "end point" or stopping point in the charging of the battery based on one of at least two different possible conditions. First, the controller 130 may cause charger 120 to provide electrical current to the battery 110 at the charge rate (which is faster than the default charge rate) for a predetermined charging duration. Accordingly, the controller 130 may cause charger 120 to stop providing electrical current to the battery 110 upon charging for the predetermined charging duration. For example, the predetermined charging duration may be determined by dividing the difference between the target state of charge and the current state of charge by the charge rate. Other charging durations (predetermined or otherwise) are possible. In another embodiment, the controller 130 may cause the charger 120 to stop charging upon the state of charge of the battery 110 reaching the target state of charge. That is, when the battery 110 is sufficiently charged as compared to a predetermined target state of charge, the charging may stop.

Although FIG. 1A suggests the charger 120 and the controller 130 as being physically apart, some embodiments include the charger 120 and the controller 130 housed in the same body or frame. For example, the body or frame may include a smartphone, a computer, a tablet, a wall-wart, a battery charging assembly, or another type of device configured to charge a battery.

The battery 110 may be associated with, for example, a mobile computing device. In such a scenario, the controller 130 is further configured to display, via a display of the mobile computing device, a plurality of charge rates higher than the default charge rate. For example, the computing device may present several charge rate options to a user of the computing device via the display. The user may select a preferred charge option from the plurality of charge rates.

In an example embodiment, the user may select the preferred charge option by interacting with a touchscreen, which may be implemented with display 124 and/or user interface 128. In an alternative embodiment, the charger 120 may include a multi-position switch 129. Each of the plurality of positions of the multi-position switch 129 may be associated with a plurality of charge rates higher than the default charge rate. In such a scenario, a user may be able to select a preferred charge option by moving the multi-position switch 129. Other ways for a user to select a preferred charge option via hardware and/or software are contemplated herein.

In some embodiments, one or more characteristics of the battery may include a number of charging cycles completed by the battery. In some instances, a single charging cycle of a battery may correspond to charging the battery to a given SOC and dissipating the power from the battery to a different SOC charge. For example, a single charging cycle may correspond to charging the battery to approximately a 100% SOC and dissipating the power from the battery to approximately a 10% SOC or lower, among other possibilities.

Figure 1B:
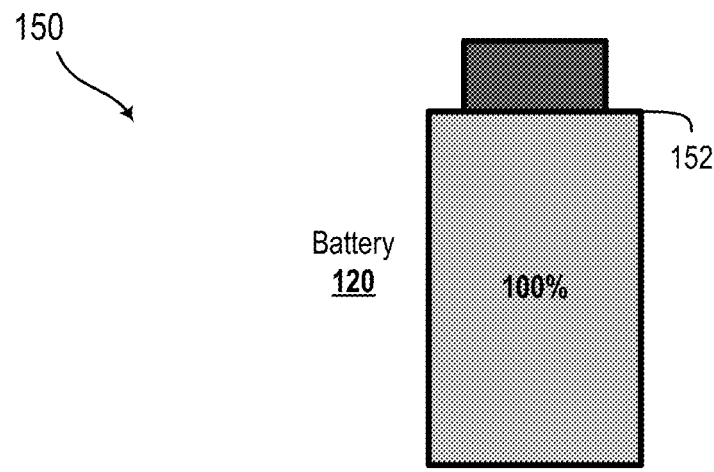
FIG. 1B illustrates examples of a state of charge (SOC), according to example embodiments.
Figure 1B:
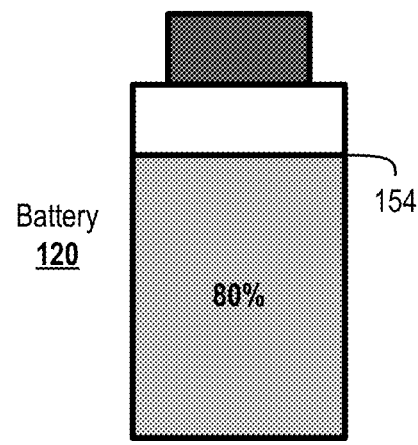
Figure 1B:
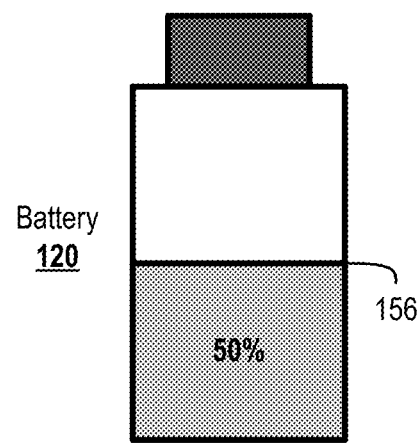

In some embodiments, the state of the battery may include the battery's state of charge (SOC). FIG. 1B illustrates examples of a state of charge (SOC), according to example embodiments. In some instances, a computing device may determine the SOC of the battery. For example, the computing device may determine that the battery has an SOC 156 of 50%, an SOC 154 of 80%, and an SOC 152 of 100%, among other possibilities.

In some embodiments, the state of the battery may be indicative of the physical state of the battery. For example, controller 130 may determine that the battery is connected to a power source for recharging the battery. Additionally or alternatively, the state of the battery may be indicative of other characteristics of the battery. For example, the characteristic of the battery may include a temperature of the battery, an ambient temperature in an environment of the battery, and/or a temperature of a system or computing device powered by the battery. Further, in some instances, the characteristic of the battery may include approaching, meeting, and/or exceeding a temperature threshold. For example, a battery may be approaching a lower or an upper temperature threshold. Further, the battery may meet or exceed the lower or upper temperature threshold, among other possibilities.

In particular, a single charging cycle may correspond to charging battery 120 to SOC 152 and dissipating the power from battery 120 to approximately lower than SOC 156. In some instances, a single charging cycle may correspond to charging the battery to increase the SOC charge by at least 5% and dissipating the power by at least 5%, among other possibilities.

In some embodiments, the computing device may determine a number of charging cycles completed by the battery. For example, the computing device may include a counter for counting the number of times the battery is charged. In some instances, the computing device may count the number of times that the SOC charge of the battery is increased. Further, in some instances, the computing device may count the number of times that the SOC charge of the battery is increased by a given threshold value. Further, the computing device may count the number of times the battery is increased and decreased by the given threshold value. For example, the computing device may count the number of times that the battery is increased by approximately a 5% SOC and the power of the battery is decreased by approximately a 5% SOC, among other possibilities.

In some embodiments, one or more characteristics of the battery may include a capacity of the battery (also referred to herein as the "discharge capacity" of the battery). In some instances, the capacity of the battery may be described as a percentage. Further, in some instances, the capacity of the battery may be described as percentage capacity of a maximum capacity, where the maximum capacity may be the highest capacity that a given battery may have throughout the life of the battery. For example, a battery with a 100% capacity may correspond to a new battery capable of charging to the maximum capacity of the battery. As such, the capacity of the battery may degrade over time or with the number of charging cycles completed by the battery, amongst other possibilities.

In some embodiments, the capacity of the battery may decrease with the number of charging cycles completed by the battery. For example, a battery that has completed 1 to 100 charging cycles may have greater than or equal to approximately a 95% capacity of its maximum capacity. Further, a battery that has completed 101 to 300 charging cycles may have approximately an 85% to 95% capacity of its maximum capacity. Yet further, a battery that has completed greater than 300 charging cycles have a less than approximately an 85% capacity of its maximum capacity. In addition, an old battery may have approximately a 15% of its maximum capacity, among other possibilities.

In some embodiments, the capacity of the battery may decrease with time as the battery ages and/or towards the later stages of the battery's life. For example, a battery that has been used for 1 to 6 months may have greater than or equal to approximately a 95% capacity of its maximum capacity. Further, a battery that has been used for 6 to 12 months may have approximately an 85% to 95% capacity of its maximum capacity. Yet further, a battery that has been used for 12 to 24 months may have a less than approximately an 85% capacity of its maximum capacity. In addition, a battery that has been used for over 24 months may have approximately a 15% capacity of its maximum capacity.

In an example embodiment, the controller 130 may be further configured to determine a wait time based on the battery type and the charge rate. That is, subsequent to stopping determining a charge complete condition (e.g. upon reaching the target state of charge), the controller 130 may wait for a predetermined wait time. As described above, the wait time period may provide time for: 1. intercalation of ions into the electrode bulk, 2. mass transfer of ions within the battery material, and/or 3. diffusion of ions in the electrolyte bulk.

After waiting for the predetermined wait time, the controller 130 is optionally configured to cause the charger to provide electrical current to the battery 110 at the default charge rate. In an example embodiment, the default charge rate may be 0.7 C, however other default charge rates are possible. In some embodiments, the default charge rate may be a charging rate at which relatively little damage to cycle life will result if used to fully charge the battery 110.

The controller 130 may be optionally configured to determine a full charge condition based on receiving information indicative of a state of charge of the battery 110 reaching the full charge capacity. That is, the controller 130 may receive information that may provide direct or indirect evidence of the battery's state of charge, which may include being equivalent to a full charge capacity. The information may include, but is not limited to, a cell/terminal voltage, a battery current, a temperature of the battery, a pressure of the battery, or any other information that may be used to determine a state of charge of a battery.

Optionally, an example embodiment includes the controller 130, in response to determining the full charge condition, causing the charger to stop providing electrical current to the battery. That is, subsequent to determining that the battery 110 has reached a full charge condition, the controller 130 may cause the charger 120 to stop providing charge to the battery 110.

FIGS. 6A and 6B illustrate a mobile device 600 according to example embodiments. The mobile device 600 may be a smartphone, a tablet, or another type of mobile computing device. The mobile device 600 may include a memory and a processor. The mobile device 600 may also include a display 602 and a rechargeable battery (not shown). Alternatively or additionally, FIGS. 6A and 6B may illustrate a user interface on the display 602. In some embodiments, the display 602 and the mobile device 600 may be local to or remote from a rechargeable battery.

In an example embodiment, the rechargeable battery may have a state of charge less than a predetermined threshold. In such a scenario, a low battery indication 604 may be displayed on the display 602. In some embodiments, a time indication 606 may be displayed on the display 602.

As shown in FIG. 6A, one or more charge options may be presented as selectable icons via the display 602. In an example embodiment, the mobile device 600 may provide a notification 610 requesting a user interaction, e.g. "Please select Charge Mode". In such a scenario, the display 602 may present a Regular Charge option 612, a Quick Charge option 614, a Fast Charge option 616, and an Ultrafast Charge option 618. The charge options may represent different charge modes and/or charging rates. In an example embodiment, the approximate amount of time to complete a respective charge mode may be displayed on the display 602.

In such a scenario, a user may select one of the selectable icons. In response, a controller of the mobile device may cause a charger, such as charger 120 as illustrated and described in reference to FIG. 1A, to charge the rechargeable battery at the charging rate associated with the selected charge option.

Additionally or alternatively, FIG. 6B illustrates a scenario in which a controller may automatically select a particular charge option and charge the rechargeable battery based at least on a contextual situation. Furthermore, the mobile device 600 may be operable to provide notifications 622 via the display 602.

In an example embodiment, a user of the mobile device 600 may have an upcoming flight from Chicago, Ill. to San Jose, Calif. at a specific time, e.g. 11:30 AM. The mobile device may determine that this context is associated with the device based on various types of contextual information. For example, the mobile device application that provides notifications 622 may have been authorized, with the user's permission, to access the calendar and/or e-mail of a user account that is associated with the device. Additionally or alternatively, the mobile device 600 may have GPS capability so as to determine a geographic position. Furthermore, the mobile device 600 may be operable to determine the amount of time between the current time and the upcoming flight time. The mobile device 600 may also be configured to determine that it is plugged into a charge supply (e.g. an auxiliary battery, a wall socket, etc.), and may, in some embodiments, only display notifications 622 when the device is plugged in.

In such a scenario, the mobile device 600 may provide a notification 624 relating to the upcoming calendar event, e.g. "Event: ORD to SJC Boarding at 11:30 AM". Furthermore, the mobile device 600 may determine that its current geographic position is at ORD and provide notification 626 via the display 602, e.g. "You have arrived at ORD". Additionally, if a power supply is connected, the mobile device 600 may provide notification 628, e.g. "Charger connected".

Under such circumstances, the mobile device 600 may automatically select a charging rate based at least on a contextual situation. In this example, the mobile device 600 may determine that the user may only have 19 minutes of charging time available before boarding a plane. As such, the mobile device 600 may select an Ultrafast charge rate as described elsewhere herein. The mobile device 600 may provide a notification 630 regarding the automatically selected charging rate, e.g. "Charging at Ultrafast rate (Approx. 15 min)". The mobile device 600 may provide a charging notification 620 while the rechargeable battery is charging.

The contextual situations or scenarios described in relation to FIGS. 6A and 6B may trigger the presentation of charging options and/or automatic charging procedures by the mobile device 600 and/or an associated controller. Additionally, contextual situations may include a rest stop on a road trip, riding on a train, riding on a plane, electrically connecting to a charging source at a new location (e.g. while traveling) or a known location (e.g. at home or at work). In response to such contextual situations, the controller may automatically prompt a user with appropriate charging scenarios based on time and location constraints. For instance, if a user connects to a charging source on a train and the ride is approximately 35 minutes, the controller may present options to charge at a Fast rate or an Ultrafast charge rate. Additionally, or alternatively, the controller may automatically select a charging rate or option based on the contextual situation. For instance, in the train ride scenario, the controller may automatically select the Fast rate based on the fact that 35 minutes remain for the train ride.

Alternatively, the mobile device, may detect that a particular contextual situation is associated with the device (e.g., "at on airport" or "20 minutes before a scheduled flight"), determine a suggested charging rate that is appropriate for the particular contextual situation, and responsively notify the user (e.g., via a graphic display and/or audible notification) of the suggested charging rate. As such, the user may be automatically provided with the opportunity to select the suggested charging rate, and possibly to opt for other charging rates instead. Further, in some embodiments, a contextual prompt may be triggered in response to the mobile device detecting that it has been connected to an electrical outlet to charge.

It is noted that a graphic user-interface (GUI), such as that shown in FIGS. 6A and 6B, may be provided via an application that a user electively installs, or that is pre-installed, on the user's device. Further, such an application may optionally be an "always-on" application that runs in the background. Running in the background may allow such an application to automatically detect contextual information (e.g., time, location, movement, temperature, calendar information, environmental data, etc.), and to automatically prompt the user when contextual information indicates that a particular charging rate may be useful in the current context associated with the device. Alternatively, the user may open such an application on an as-needed basis.

It is understood that the scenarios described herein represent a subset of many different contextual situations in which a rechargeable battery may need to charge for a specified period of time and/or at a specified charging rate. For example, contextual situations in which the charging time is limited and/or a specified charging rate is preferred are contemplated herein. Furthermore, contextual situations which include maintaining a desirable battery cycle life are contemplated.

Generally, an individual user or a group of users may create a data-based "user-account," which may also be referred to simply as an "account." A user-account for a particular user or user group may include data related to the particular user or user group, which the user or user group has opted to provide for the user-account. As such, a particular user's account may, in a sense, be a data-based representation of that particular user. A user may create an account for various applications, web sites, and/or online services, for instance. Examples of user accounts include e-mail accounts, social network accounts, online financial accounts, accounts with service providers, and cellular service accounts that may be associated with phone numbers, among other possibilities. Further, in some cases, a user may have a single user-account that serves as a data-based representation of the user for multiple services, websites, applications, etc. For instance, a user could opt to use their e-mail account or social network account as a common login for various online services and applications, which are provided by a number of different entities. Further, a user of a computing device, such as a mobile phone, laptop computer, or wearable computing device, may associate their user-account with the computing device itself, such that while the user is operating the computing device, their account will be associated with applications that are provided on the computing device (so long as the user has given permission for such use of their account).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

III. Example Methods

Figure 2:
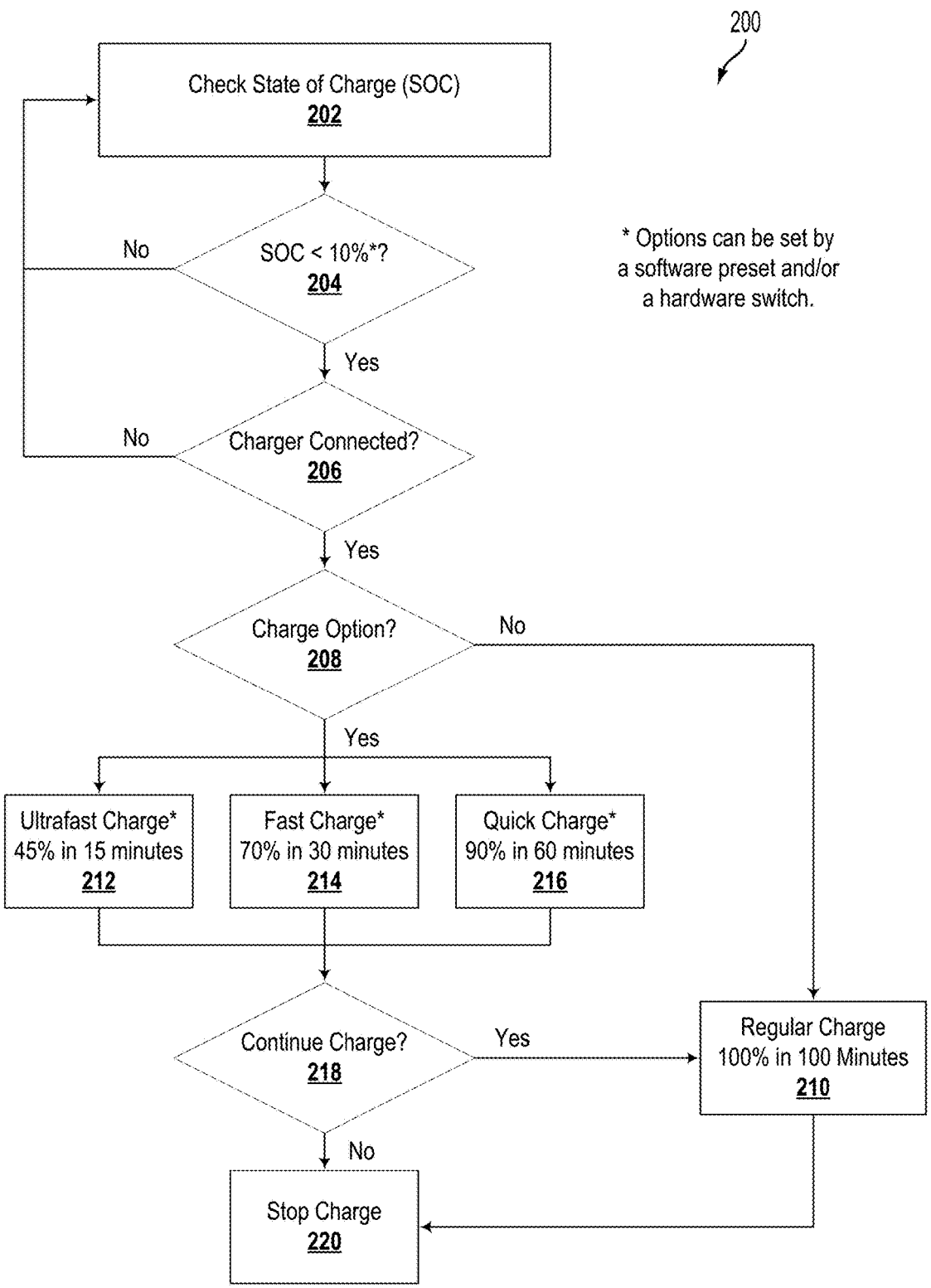
FIG. 2 is a flowchart describing a method for charging a battery, according to example embodiments.

FIG. 2 is a flowchart describing a method 200 for charging a battery, according to example embodiments. The method 200 may include various blocks or steps. The blocks or steps may be carried out individually or in combination. The blocks or steps may be carried out in any order and/or in series or in parallel. Further, blocks or steps may be omitted or added to method 200. The blocks of method 200 may be carried out to with some or all of the elements of the system 100 as illustrated and described in reference to FIGS. 1A and 1B.

In block 202 the method may include checking a state of charge (SOC) of a battery, such as battery 110. Block 204 may include determining whether the SOC is less than a user-definable level, e.g. less than 10%. If the SOC is more than the user-definable level, the method 200 may return to block 202.

If the SOC is less than the user-definable level, block 206 may include determining whether a charger is connected. The charger may include charger 120 as illustrated and described in reference to FIG. 1A. The determination may include a connectivity check, which may include measuring a voltage across and/or a current through the battery. Other ways to determine whether a charger is connected to a battery are contemplated herein.

If the charger is connected, the method 200 may include selecting a charge option in block 208. In such a scenario, a user may select, via hardware and/or software, a preferred charge option from a plurality of charge options. The plurality of charge options may be associated with charge rates higher than a default charge rate. For example, the charge options may include C-rates of 1.0, 1.5, and/or 2.0. Other C-rates are possible. If a preferred charge option is selected, blocks 212, 214, and 216 include charging at the charge rate associated with the preferred charge option for a predetermined amount of time. For example, block 212 includes "ultrafast" charging at 2.0 C for 15 minutes. Furthermore, block 214 includes "fast" charging at 1.5 C for 30 minutes. Additionally, block 216 may include "quick" charging at 1.0 C for 60 minutes. Other predetermined amounts of time are possible.

When the predetermined amount of time has elapsed while charging the battery, the charger (and/or a controller of the charger) may stop the charge (block 220). Alternatively, the charger may continue under a "regular charge" condition to provide a 0.7 C charging rate for 100 minutes.

In some embodiments, the charger and/or a controller of the charger may determine a wait time based on the battery type and the charge rate. For example, based on the prior "ultrafast" charge rate being 2.0 C, the wait time may be determined to be 30 minutes. Such a wait time may provide for intercalation of ions within the battery.

In such a scenario, the charger may wait for the wait time, e.g. not provide any charging current to the battery. After waiting for the wait time, the charger may proceed to further charge the battery. For example, the charger may provide electrical current to the battery at the default charge rate, e.g. 0.7 C. The charger may then determine a full charge condition based on receiving information indicative of a state of charge of the battery reaching the full charge capacity. When the full charge condition is determined, the charger may stop providing electrical current to the battery.

Figure 3:
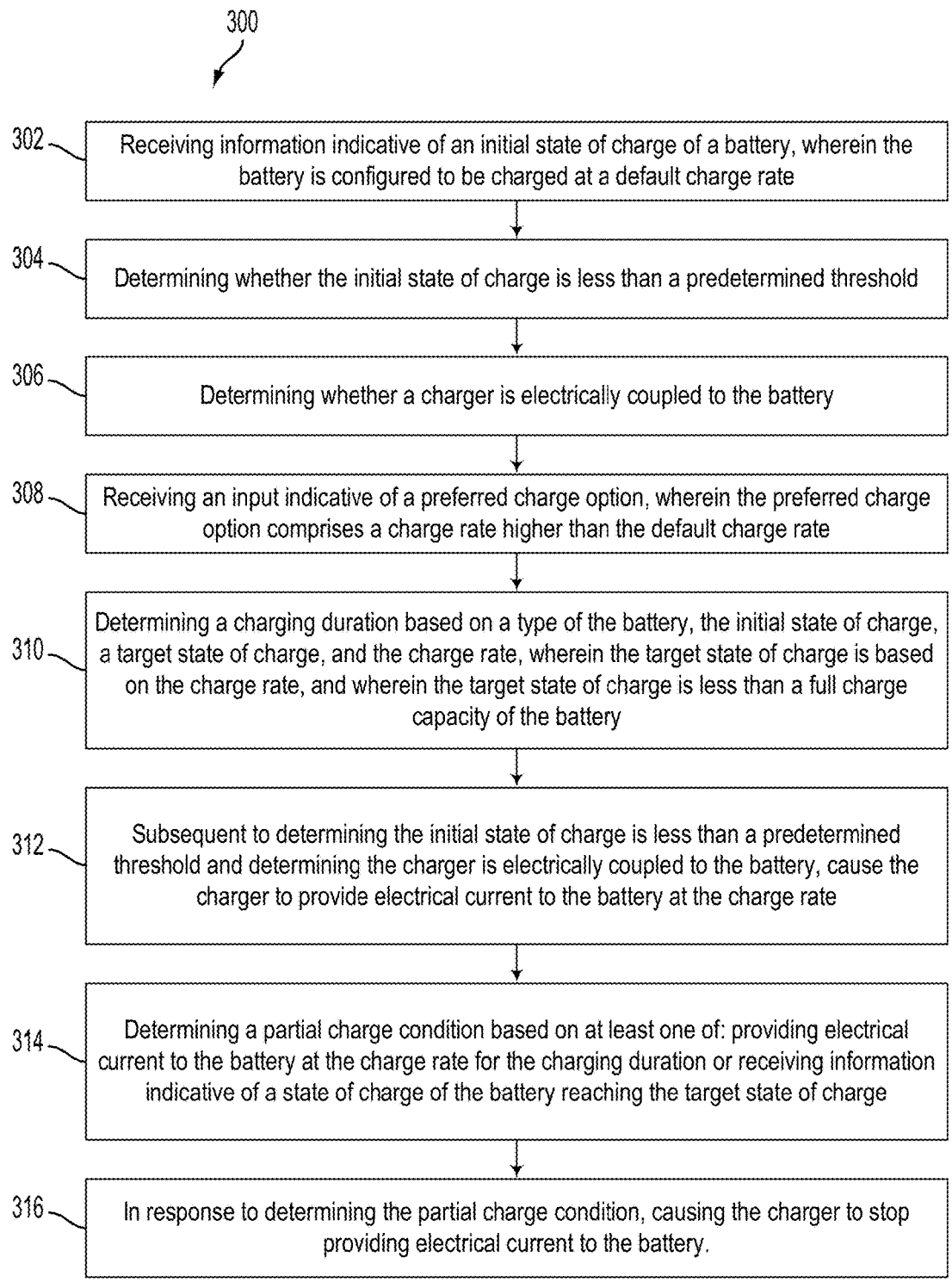
FIG. 3 illustrates a method, according to an example embodiment.

FIG. 3 illustrates a method 300, according to an example embodiment. The method 300 may include various blocks or steps. The blocks or steps may be carried out individually or in combination. The blocks or steps may be carried out in any order and/or in series or in parallel. Further, blocks or steps may be omitted or added to method 300.

The blocks of method 300 may be carried out by system 100 as illustrated and described in reference to FIGS. 1A and 1B. Method 300 may include similar or identical blocks as method 200, as illustrated and described in reference to FIG. 2.

The method 300 may be carried out by a controller, such as controller 130 described in reference to FIG. 1A. The controller may include at least one processor and a memory. The controller may include an application-specific integrated circuit or another type of circuit and/or computer.

Block 302 includes receiving information indicative of an initial state of charge of a battery. The battery is configured to be charged at a default charge rate, which may be 0.7 C or another charge rate. The battery may be similar or identical to battery 110 as illustrated and described in reference to FIG. 1A.

Block 304 includes determining whether the initial state of charge is less than a predetermined threshold. As described above, determining the initial state of charge may include receiving information indicative of a terminal voltage, a current, a temperature, and/or a pressure of the battery.

Block 306 includes determining whether a charger is electrically coupled to the battery. Such a determination may include a continuity check. Other types of checks to determine electrical coupling are possible.

Block 308 includes receiving an input indicative of a preferred charge option. For instance, a user may input, via hardware and/or software, the preferred charge option. The preferred charge option includes a charge rate higher than the default charge rate. For example, the preferred charge rate may include 1.0 C, 1.5 C, and/or 2.0 C. Other preferred charge rates are possible.

Block 310 includes determining a charging duration based on a type of the battery, the initial state of charge, a target state of charge, and the charge rate. In other words, a determination may be made regarding the length of time to charge the battery. In an example embodiment, the determination may be made based on initial and target states of charge (e.g. the difference between the two states) as well as the charge rate selected by the user (e.g. 2 C). In such a scenario, target state of charge is based on the charge rate. For example, for a 2 C charge rate, the target state of charge may be 45%. The target state of charge is less than a full charge capacity of the battery.

Block 312 includes, subsequent to determining the initial state of charge is less than a predetermined threshold and determining the charger is electrically coupled to the battery, cause the charger to provide electrical current to the battery at the charge rate. That is, provided the battery is properly connected to the charger and the initial state of charge of the battery is less than a minimum threshold, the charger may be controlled to charge the battery at the user-defined charge rate.

Block 314 includes determining a partial charge condition based on at least one of: providing electrical current to the battery at the charge rate for the charging duration or receiving information indicative of a state of charge of the battery reaching the target state of charge. Put another way, the method may include determining that a condition has been met once the battery has either reached a predetermined state of charge or once the battery has charged at the charge rate for a predetermined period of time.

Block 316 includes, in response to determining the partial charge condition, causing the charger to stop providing electrical current to the battery. In other words, once the battery has achieved the predetermined state of charge or has charged at the charge rate for a predetermined period of time, the charger may stop providing charging current to the battery.

The method 300 may include presenting a user with a plurality of charge options. The charge options may include an "ultrafast charge", a "fast charge", and a "quick charge".

The ultrafast charge may include a charge rate of 2.0×C. As described above, C may include a charge rate equal to charging the battery from an empty state to a full charge state within one hour or similar time period. The ultrafast charge may also include a charge duration of 15 minutes and a target state of charge of 45%.

The fast charge may include a charge rate of 1.5×C. The fast charge may include a charge duration of 30 minutes and a target state of charge of 70%.

The quick charge may include a charge rate of 1.0×C. The quick charge may include a charge duration of 60 minutes and a target state of charge of 90%.

It is understood that charge options may include many other variations than those listed herein. For example, charge options may include different charge rates, target states of charge, initial state of charge thresholds, etc. The present disclosure contemplates all such variations.

Figure 4:
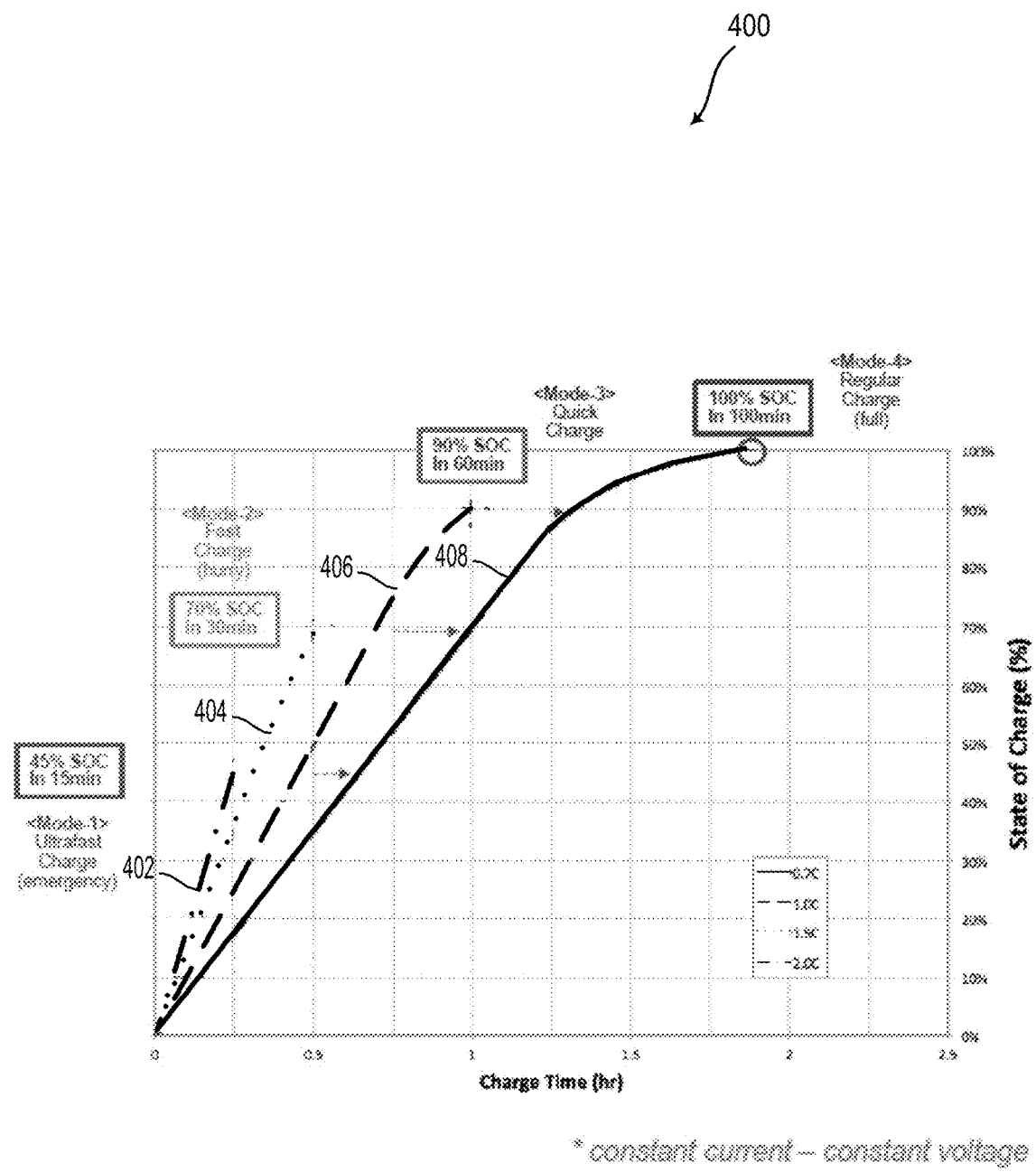
FIG. 4 illustrates an example graph of several battery charging scenarios, according to example embodiments.

FIG. 4 illustrates an example graph of several battery charging scenarios, according to example embodiments. Namely, the graph illustrates the state of charge versus time under various charging scenarios. For example, graph 402 illustrates an example battery charged at an "ultrafast" charge rate for 15 minutes up to a 45% SOC. Graph 404 illustrates an example battery charged at a "fast" charge rate for 30 minutes up to a 70% SOC. Graph 406 illustrates an example battery charged at a "quick" charge rate for 60 minutes up to a 90% SOC. Graph 408 illustrates an example battery charged at a "default" charge rate for 100 minutes up to a 100% SOC. The example graphs shown in FIG. 4 are example purposes only and are not meant to limit the disclosure in any way. For example, battery need not be a 0% SOC prior to charging under the presently disclosed methods and systems. Furthermore, batteries could be charged a different charge rates than those illustrated.

Figure 5:
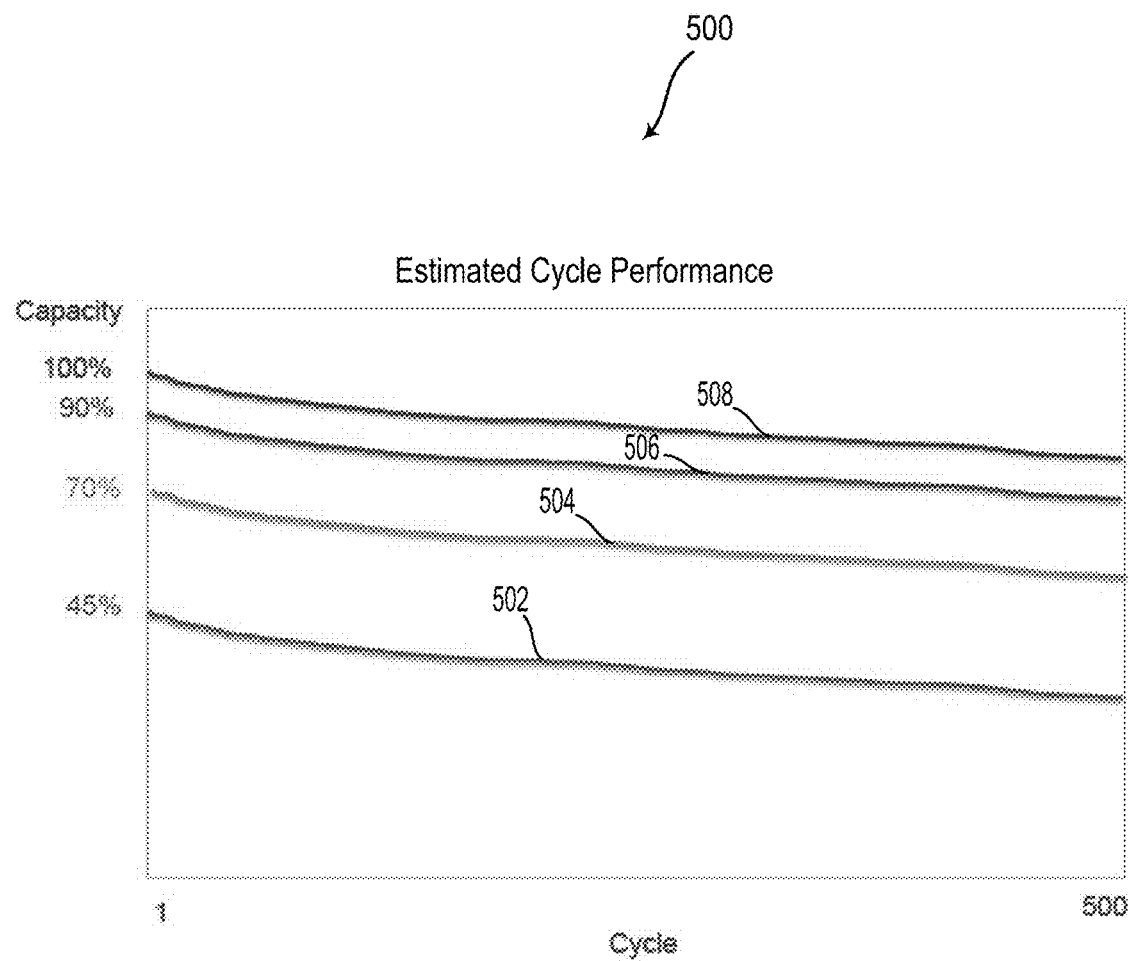
FIG. 5 illustrates an example graph of estimated cycle performance of a battery, according to example embodiments.

FIG. 5 illustrates an example graph of estimated cycle performance of a battery, according to example embodiments. Specifically, the graph illustrates cycle performance of an example battery or batteries over many charge/recharge cycles. Graph 502 illustrates a 45% SOC level relative to a "new" battery over many recharge cycles. Generally, it is understood that over the life cycle of a battery, charge capacity diminishes. Thus, graphs 504, 506, and 508 illustrate similar, monotonic, decreases in 70%, 90%, and 100% SOC levels of an example battery or batteries over many charging cycles. Such degradation in battery capacity may be mitigated or at least reduced with the presently disclosed method and system.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
  a battery, wherein the battery is of a given battery type, wherein the battery type comprises a full charge capacity and a default charge rate, and wherein the battery initially has an initial state of charge;

a charger configured to controllably provide an electrical current to the battery;
a controller configured to:
receive information indicative of the initial state of charge of the battery;
determine whether the initial state of charge is less than a predetermined threshold;
determine whether the charger is electrically coupled to the battery;
receive an input indicative of a preferred charge option, wherein the preferred charge option comprises a charge rate higher than the default charge rate;
determine a charging duration based on the battery type, the initial state of charge, a target state of charge, and the charge rate, wherein the target state of charge is based on the charge rate, and wherein the target state of charge is less than the full charge capacity;
subsequent to determining the initial state of charge is less than a predetermined threshold and determining the charger is electrically coupled to the battery, cause the charger to provide electrical current to the battery at the charge rate;
determine a partial charge condition based on at least one of: providing electrical current to the battery at the charge rate for the charging duration or receiving information indicative of a state of charge of the battery reaching the target state of charge;
calculate a wait time based on the battery type and the charge rate;
subsequent to determining the partial charge condition, wait for the wait time;
subsequent to waiting for the wait time, cause the charger to provide electrical current to the battery at the default charge rate;
determine a full charge condition based on receiving information indicative of a state of charge of the battery reaching the full charge capacity; and
in response to determining the full charge condition, cause the charger to stop providing electrical current to the battery.

2. The system of claim 1, wherein the battery is associated with a mobile computing device and wherein the controller is further configured to display, via a display of the mobile computing device, a plurality of charge rates higher than the default charge rate, and wherein the preferred charge option is selected from the plurality of charge rates.

3. The system of claim 1, wherein the battery type comprises at least one lithium ion cell.

4. The system of claim 1, wherein the battery is associated with an external battery pack, wherein the charger comprises a multi-position switch, wherein a plurality of positions of the multi-position switch are associated with a plurality of charge rates higher than the default charge rate, and wherein receiving an input indicative of a preferred charge option is based on a position of the multi-position switch.

5. The system of claim 1, wherein the default charge rate comprises 0.7×C, wherein C comprises a charge rate equal to charging the battery from an empty state to a full charge state in one hour.

6. The system of claim 1, wherein the charger is further configured to controllably provide constant DC current to the battery.

7. The system of claim 1, wherein the charger is further configured to controllably provide pulsed DC current to the battery.

8. The system of claim 1, wherein the preferred charge option is selected automatically based on a contextual scenario.

9. A method comprising:
receiving information indicative of an initial state of charge of a battery, wherein the battery is configured to be charged at a default charge rate;
determining whether the initial state of charge is less than a predetermined threshold;
determining whether a charger is electrically coupled to the battery;
receiving an input indicative of a preferred charge option, wherein the preferred charge option comprises a charge rate higher than the default charge rate;
determining a charging duration based on a type of the battery, the initial state of charge, a target state of charge, and the charge rate, wherein the target state of charge is based on the charge rate, and wherein the target state of charge is less than a full charge capacity of the battery;
subsequent to determining the initial state of charge is less than a predetermined threshold and determining the charger is electrically coupled to the battery, causing the charger to provide electrical current to the battery at the charge rate;
determining a partial charge condition based on at least one of: providing electrical current to the battery at the charge rate for the charging duration or receiving information indicative of a state of charge of the battery reaching the target state of charge;
calculating a wait time based on the battery type and the charge rate;
subsequent to determining the partial charge condition, waiting for the wait time;
subsequent to waiting for the wait time, causing the charger to provide electrical current to the battery at the default charge rate;
determining a full charge condition based on receiving information indicative of a state of charge of the battery reaching the full charge capacity; and
responsive to determining the full charge condition, causing the charger to stop providing electrical current to the battery.

10. The method of claim 9, wherein the target state of charge is further based on maintaining long-term cycle performance of the battery.

11. The method of claim 9 wherein the battery is associated with a mobile computing device, wherein the mobile computing device comprises a display, the method further comprising causing the mobile computing device to display a plurality of charge rates higher than the default charge rate, and wherein the preferred charge option is selected from the plurality of charge rates.

12. The method of claim 9, wherein the battery is associated with an external battery pack, wherein the charger further comprises a multi-position switch, wherein a plurality of positions of the multi-position switch are associated with a plurality of charge rates higher than the default charge rate, and wherein receiving an input indicative of a preferred charge option is based on a position of the multi-position switch.

13. The method of claim 9, wherein the default charge rate comprises 0.7×C, wherein C comprises a charge rate equal to charging the battery from an empty state to a full charge state in one hour.

14. The method of claim 9, wherein causing the charger to provide electrical current to the battery at the charge rate comprises providing a pulsed DC current to the battery.

15. A method comprising:
receiving information indicative of an initial state of charge of a battery, wherein the battery is configured to be charged at a default charge rate;
determining a charge needed condition based on the initial state of charge being less than a predetermined threshold;
determining a charger connected condition based on a charger being electrically coupled to the battery;
providing a plurality of charge options, wherein each charge option comprises a charge rate, a charging duration, and a target state of charge based on a type of the battery and the initial state of charge, wherein the charge rate is higher than the default charge rate;
receiving an input indicative of a preferred charge option, wherein the preferred charge option is selected from the plurality of charge options, wherein the preferred charge option comprises a preferred charge rate, a preferred charging duration, and a preferred target state of charge;
in response to the charge needed condition and the charger connected condition, causing the charger to provide electrical current to the battery at the preferred charge rate;
determining a partial charge condition based on at least one of: providing electrical current to the battery at the preferred charge rate for the preferred charging duration or receiving information indicative of a state of charge of the battery reaching the preferred target state of charge;
calculating a wait time based on the battery type and the charge rate;
subsequent to determining the partial charge condition, waiting for the wait time;
subsequent to waiting for the wait time, causing the charger to provide electrical current to the battery at the default charge rate;
determining a full charge condition based on receiving information indicative of a state of charge of the battery reaching the full charge capacity; and
responsive to determining the full charge condition, causing the charger to stop providing electrical current to the battery.

16. The method of claim 15, wherein the charge options comprise at least an ultrafast charge, a fast charge, and a quick charge.

17. The method of claim 16, wherein the ultrafast charge comprises a charge rate of 2.0×C, wherein C comprises a charge rate equal to charging the battery from an empty state to a full charge state in one hour, wherein the ultrafast charge further comprises a charge duration of 15 minutes and a target state of charge of 45%.

18. The method of claim 16, wherein the fast charge comprises a charge rate of 1.5×C, wherein C comprises a charge rate equal to charging the battery from an empty state to a full charge state in one hour, wherein the fast charge further comprises a charge duration of 30 minutes and a target state of charge of 70%.

19. The method of claim 16, wherein the quick charge comprises a charge rate of 1.0×C, wherein C comprises a charge rate equal to charging the battery from an empty state to a full charge state in one hour, wherein the quick charge further comprises a charge duration of 60 minutes and a target state of charge of 90%.

20. The method of claim 15, wherein the charge options are determined based on time and location constraints of a user.

* * * * *